US012507817B2

(12) United States Patent
Purdy et al.

(10) Patent No.: US 12,507,817 B2
(45) Date of Patent: Dec. 30, 2025

(54) INFECTION CONTROL FILTER LABEL

(71) Applicant: Greenwood Marketing, LLC, Bedford, NY (US)

(72) Inventors: William J. Purdy, Bedford, NY (US); Robert Purdy, Bedford, NY (US)

(73) Assignee: Greenwood Marketing, LLC, Bedford, NY (US)

( * ) Notice: Subject to any disclaimer, the term of this patent is extended or adjusted under 35 U.S.C. 154(b) by 400 days.

(21) Appl. No.: 17/960,104

(22) Filed: Oct. 4, 2022

(65) Prior Publication Data

US 2023/0106871 A1     Apr. 6, 2023

Related U.S. Application Data

(60) Provisional application No. 63/251,998, filed on Oct. 4, 2021.

(51) Int. Cl.
*A47G 9/00*        (2006.01)
*A47C 31/00*      (2006.01)
(Continued)

(52) U.S. Cl.
CPC ............ *A47G 9/007* (2013.01); *A47C 31/007* (2013.01); *A47G 2009/001* (2013.01);
(Continued)

(58) Field of Classification Search
CPC .. A47G 2009/001; A47G 9/02; A47G 9/0207; A47G 9/0223; A47G 9/10; A47G 9/0253; A47G 9/07; A47C 31/007; A47C 31/105; A47C 31/113; B01D 2239/0421; B01D 2239/0627; B01D 2239/0681;
(Continued)

(56) References Cited

U.S. PATENT DOCUMENTS 877,692 A      1/1908   Wyman
1,779,458 A   *   10/1930   Annis .................. F02M 35/024
                                                                55/379
(Continued)

OTHER PUBLICATIONS

USPTO acting as International Searching Authority, "International Search Report and Written Opinion," International Application No. PCT/US2022/045707, Jan. 13, 2023.

*Primary Examiner* — Matthew Troutman
*Assistant Examiner* — Morgan J Mcclure
(74) *Attorney, Agent, or Firm* — DENTONS Durham Jones Pinegar (57) ABSTRACT

An infection control filter label includes a frame and a filter membrane that covers a window through the frame. The frame may be removably secured to a cover for an item, such as a cushion (e.g., a pillow, a positioner, a mattress topper, a mattress, a seat cushion, etc.), bedding (e.g., a duvet, etc.), or the like to provide a sealed cover for the item. The sealed cover may be impermeable, with the infection control filter label limiting the passage of dust and microorganisms (e.g., fungi, bacteria, mold spores, etc.) from passing therethrough. Thus, the sealed cover may protect its contents from external factors (e.g., sick individuals, etc.) while protecting the environment outside the sealed cover from the contents of the sealed cover. Information about the item may be provided on the frame; for example, by printing, writing, or the like.

10 Claims, 4 Drawing Sheets

(51) Int. Cl.
  *A47G 9/02* (2006.01)
  *A47G 9/10* (2006.01)
  *B01D 46/10* (2006.01)
(52) U.S. Cl.
  CPC .............. *A47G 9/02* (2013.01); *A47G 9/0207* (2013.01); *A47G 9/10* (2013.01); *B01D 46/10* (2013.01); *B01D 2239/0421* (2013.01); *B01D 2257/91* (2013.01); *B01D 2279/35* (2013.01)
(58) Field of Classification Search
  CPC .... B01D 2239/0668; B01D 2239/1216; B01D 39/1623; B01D 39/1692; B01D 2257/91; B01D 46/10; B01D 2279/35; B01D 2279/45
  USPC .............................................. 55/385.4, 385.6
  See application file for complete search history.

(56) References Cited

U.S. PATENT DOCUMENTS

| | | | | |
|---|---|---|---|---|
| 4,690,757 | A * | 9/1987 | Mathus | B01D 63/08 210/232 |
| 5,269,030 | A * | 12/1993 | Pahno | A61G 7/02 4/615 |
| 5,615,433 | A * | 4/1997 | Martin | A47D 5/006 5/655 |
| 7,178,555 | B2 * | 2/2007 | Engel | B65D 77/225 426/118 |
| 8,263,720 | B1 * | 9/2012 | Salamone | A61L 26/0019 424/443 |
| 8,512,428 | B2 * | 8/2013 | Ueki | B01D 46/54 156/107 |
| 8,561,233 | B2 * | 10/2013 | Navan | A47G 9/0207 5/724 |
| 8,950,028 | B2 | 2/2015 | Navan et al. | |
| 10,960,238 | B1 * | 3/2021 | Reele | A41D 13/1107 |
| 11,180,228 | B1 * | 11/2021 | Scheffer | B63B 34/26 |
| 2002/0139746 | A1 * | 10/2002 | Koslow | B01J 20/28004 210/488 |
| 2007/0283498 | A1 * | 12/2007 | Shelby | A47C 27/002 5/724 |
| 2009/0301044 | A1 * | 12/2009 | Miller | B01D 46/0005 55/475 |
| 2010/0242421 | A1 * | 9/2010 | Conrad | A47L 9/1666 55/309 |
| 2011/0113553 | A1 * | 5/2011 | Johan | A47C 31/007 5/499 |
| 2011/0154570 | A1 * | 6/2011 | Curos Santaeularia | A47G 9/0253 5/490 |
| 2012/0198804 | A1 * | 8/2012 | Kaiser | B01D 46/62 55/486 |
| 2012/0266753 | A1 * | 10/2012 | Woolfson | A47C 31/007 96/6 |
| 2013/0025067 | A1 * | 1/2013 | Ober | A47G 9/0253 5/737 |
| 2013/0139699 | A1 * | 6/2013 | Rivera | B65D 85/8061 99/295 |
| 2013/0212991 | A1 * | 8/2013 | Albert | F24F 13/20 55/385.2 |
| 2014/0189955 | A1 * | 7/2014 | Alletto, Jr. | A47G 9/10 5/636 |
| 2014/0318653 | A1 * | 10/2014 | Hoffman | B65D 77/225 137/855 |
| 2015/0107026 | A1 | 4/2015 | Navan et al. | |
| 2016/0220046 | A1 | 8/2016 | Alletto, Jr. | |
| 2017/0152409 | A1 * | 6/2017 | Lee | B05D 3/0406 |
| 2017/0314812 | A1 * | 11/2017 | Hurley | B01D 46/0005 |
| 2017/0348624 | A1 * | 12/2017 | Do | B01D 46/0005 |
| 2018/0279798 | A1 * | 10/2018 | Conway | A47C 27/002 |
| 2020/0239740 | A1 * | 7/2020 | Tsubouchi | C09J 7/385 |
| 2021/0186227 | A1 * | 6/2021 | Woolfson | A47C 27/122 |
| 2021/0290991 | A1 * | 9/2021 | Mozayan-Isfahani | A62B 18/084 |
| 2022/0204068 | A1 * | 6/2022 | Noar | B62B 9/142 |
| 2022/0226762 | A1 * | 7/2022 | Chen | B01D 46/0041 |
| 2022/0297040 | A1 * | 9/2022 | Troutman | B01D 39/1692 |
| 2023/0089672 | A1 * | 3/2023 | Mok | B01D 46/10 55/497 |
| 2023/0201751 | A1 * | 6/2023 | Mok | B01D 46/0086 55/495 |
| 2023/0320911 | A1 * | 10/2023 | Souke | A61G 1/0567 5/611 |
| 2024/0173947 | A1 * | 5/2024 | Inoue | B32B 27/281 |

* cited by examiner

INFECTION CONTROL FILTER LABEL

CROSS-REFERENCE TO RELATED APPLICATION

A claim for priority to the Oct. 4, 2021 filing date of U.S. Provisional Patent Application No. 63/251,998, titled ADHESIVE FILTER FOR USE WITH MATTRESSES AND CUSHIONS ("the '998 Provisional Application"), is hereby made pursuant to 35 U.S.C. § 119(e). The entire disclosure of the '998 Provisional Application is hereby incorporated herein.

TECHNICAL FIELD

This disclosure relates generally to filters for cushions (e.g., pillows, mattresses, positioners, etc.), bedding, and other items. The filters may be removably secured in place over openings, or vents, in the covers of cushions, bedding, or other items. This disclosure also relates to methods for maintaining cushions, bedding, and other substrates, including methods for minimizing microbial and/or particulate loads in cushions, bedding, and other items and maintenance methods that may be employed in healthcare settings (e.g., in hospitals, surgical centers, clinics, offices, etc.).

SUMMARY

In one aspect, a filter is disclosed that may be used in connection with a cover for an item, such as a cushion (e.g., a pillow, a mattress, a mattress topper, a positioner, a seat cushion, etc.), bedding (e.g., a duvet, etc.), or the like. Such a filter may be positioned over an opening, or a vent, through the cover. The filter may comprise a temporary filter, which may be removably placed over the opening through the cover. When placed over the opening through the cover, the filter may filter air that flows into and/or out of the cover.

The filter may comprise a frame and a filter membrane. The frame may include a window, which may be located centrally through the frame. The filter membrane may extend across the window (e.g., the entire window, etc.) through the frame. An outer periphery of the filter membrane (e.g., an entire outer periphery of the filter membrane, etc.) may be secured to the frame.

The filter membrane may prevent particles with a dimension (e.g., a minimum distance across the particle, such as a diameter of the particle, etc.) that exceeds a particular size from passing through the filter. Stated another way, a pore size of the filter membrane may dictate the size of particles that pass through the filter membrane. In some embodiments, the pore size of the filter membrane may limit the passage of fungi, bacteria, mold spores, and most dust particles through the filter membrane.

The filter may also include at least one support layer, which may be superimposed with (e.g., completely superimposed with, etc.) the filter membrane. In some embodiments, the filter membrane may be superimposed between, or sandwiched between, two support layers. Each support layer may mechanically support the filter membrane. Each support layer may be secured to the frame and/or the filter membrane of the filter.

The frame may comprise a label. Accordingly, the filter may be referred to as a "filtered label" or as an "infection control filter label." The label may receive and provide information about the filter, the cover, and/or the item (e.g., the cushion, the bedding, etc.). For example, a date may be provided on the label. Such a date may indicate the date on which the filter was placed on the cover, a date on which the filter is to be removed from the cover and replaced with another, clean filter, or a date on which the cover or the item with which the cover is used is to be removed from service. As another example, information about the patient using the item (e.g., name, identification number, etc.) may be provided on the label. As yet another example, information about the location (e.g., room number, etc.) where the item has been used may be included on the label.

A lower surface of the frame may be coated with an adhesive material that enables the frame to be removably secured to a cover of an item (e.g., a cushion, bedding, etc.). The adhesive material may comprise any suitable adhesive that will establish a substantially impermeable barrier (e.g., airtight, water-resistant, etc.) or an impermeable barrier (e.g., airtight, waterproof, etc.) between the frame and portions of the cover against which the frame is positioned. The adhesive material may comprise a releasable adhesive material (e.g., a pressure-sensitive adhesive (PSA) material, etc.), which may enable the frame to be removed from (e.g., pulled away from, etc.) the cover without damaging the cover. The adhesive material may adhere more strongly to a material of the frame than to a material of the cover. Thus, upon removal of the frame from the cover, the adhesive material may tend to remain on the frame. In some embodiments, little or no residue of the adhesive material may remain on the cover as the frame is removed from the cover.

An adhesive liner may be releasably secured to the adhesive material on the lower surface of the frame to protect the adhesive material until the frame of the filter is to be adhered to a cover of an item (e.g., a cushion, bedding, etc.). The adhesive liner may comprise a flexible film with a smooth surface that will adhere, or stick, to the adhesive material, but can be readily removed from the adhesive material while leaving substantially all of the adhesive material on the lower surface of the frame (i.e., without pulling the adhesive material with it). The adhesive liner may extend across the entire frame, including over the window through the frame. Thus, the adhesive liner may protect the adhesive material on the lower surface of the frame as well as a lower surface of the filter membrane or support layer exposed through the window defined by the frame until the adhesive liner is peeled away from the lower surface of the frame to enable the filter to be secured in place over an opening through a cover for an item.

Optionally, a protective cover, or top liner, may be releasably secured to the filter over a top surface of the filter membrane or a support layer (if any) that overlies the top surface of the filter membrane. The protective cover may comprise a flexible film that may be adhesively secured (e.g., with a pressure-sensitive adhesive adjacent to an outer periphery of a lower surface of the protective cover, etc.) to inner peripheral portions of the frame to protect the top surface of the filter membrane or a support layer (if any) over the top surface of the frame. Upon placement of the filter over an opening through a cover for an item (e.g., a cushion, bedding, etc.) the protective cover may be peeled off of the filter to expose the filter membrane or any support layer over the filter membrane.

In another aspect, this disclosure includes covers with openings, or vents, that may be covered with a filter according to this disclosure. Such a cover may be formed from a substantially impermeable material or an impermeable material. Additionally, such a cover may include impermeable seams (e.g., radiofrequency (RF) welded seams, heat sealed seams, compression sealed seams, etc.). The cover may include an interior within which an item (e.g., a cushion (e.g., a pillow, a mattress, a mattress topper, a positioner, a seat cushion, etc.), bedding, etc.) may be disposed.

Items, such as cushions, bedding, and other items, that include a cover and a filter according to this disclosure are another aspect of this disclosure.

In another aspect, a method of protecting an item (e.g., a cushion, bedding, etc.) includes placing a cover that is substantially impermeable or impermeable over the item and securing a filter of this disclosure in place over an opening, or vent, through the cover. Such a method may prevent exposure of the item to contaminants (e.g., microorganisms, dust, etc.) from an environment in which the item is used and/or from one or more individuals who use the item. Such a method may prevent contaminants from the item from being released into an environment in which the item is used and/or onto one or more individuals who use the item. Such a method may include removably securing a filter in place over the opening through the cover, as well as removing the filter from the cover and replacing a fresh filter of this disclosure over the opening.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Figure 1:
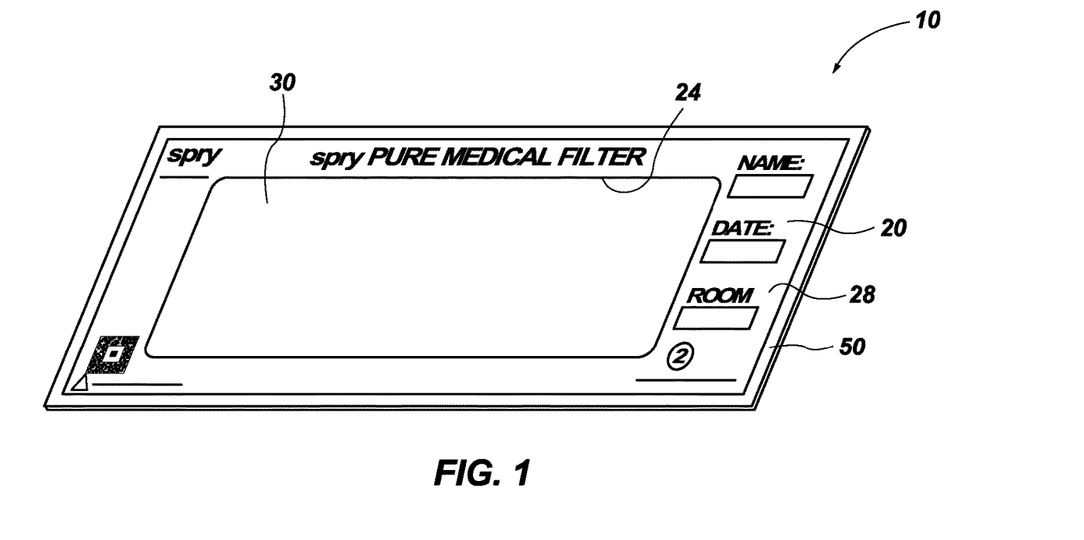
FIG. 1 is a perspective view of an embodiment of a filter according to this disclosure.
Figure 2:
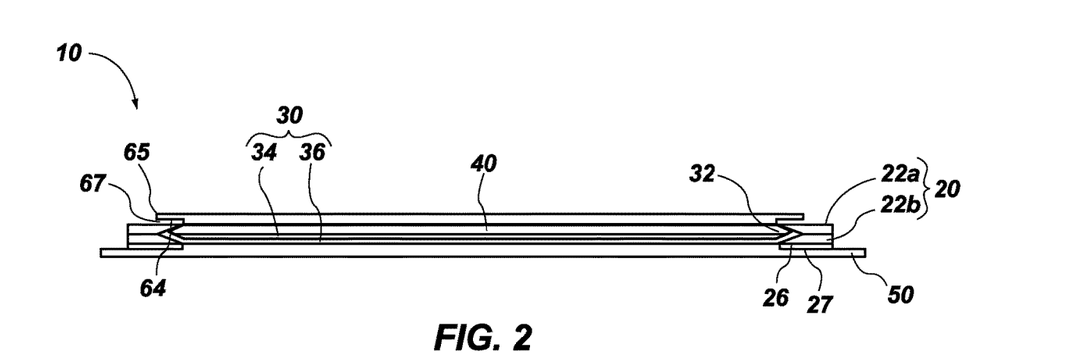
FIG. 2 provides a cross-sectional representation (not to scale) of the embodiment of the filter shown in FIG. 1, depicting an adhesive liner that initially carries the filter.

With reference to FIGS. 1 and 2, an embodiment of a filter 10 is illustrated. The filter 10 includes a frame 20 and a filter membrane 30. The filter 10 may also include at least one support layer 40.

The frame 20 of the filter 10 may include one or more layers 22. In the illustrated embodiment (see FIG. 2), the frame 20 may include a plurality of layers 22a, 22b, etc., such as a top layer 22a and a bottom layer 22b. Each layer 22a, 22b, etc. of the frame 20 may be formed form a durable, pliable material. Without limitation, each layer 22a, 22b, etc. may be formed from a paper or paper-like material (i.e., a synthetic material, such as biaxially oriented polypropylene (BOPP) or high-density polyethylene (HDPE)). In some embodiments, the frame 20 may be water-resistant or waterproof (which may enable it to remain intact and viable after being washed or disinfected one or more times). In embodiments where the frame includes a plurality of layers 22a, 22b, etc., portions (e.g., peripheral portions, etc.) of adjacent layer 22a, 22b, etc. may be secured to each other (e.g., adhesively, etc.).

A window 24 may be defined through the frame 20. In embodiments where the frame 20 includes two or more layers 22a, 22b, etc., the window 24 may extend through each layer 22a, 22b, etc. of the frame 20. The window 24 may be located centrally through the frame 20.

A lower surface 26 of the frame 20 may be coated with an adhesive material 27. The adhesive material 27 may enable the frame 20 to be removably secured to a cover of a cushion. The adhesive material 27 may comprise any suitable adhesive that will establish a substantially impermeable barrier (e.g., airtight, water-resistant, etc.) or an impermeable barrier (e.g., airtight, waterproof, etc.) between the frame 20 and portions of the cover against which the frame 20 is positioned. The adhesive material 27 may comprise a releasable adhesive material (e.g., a pressure-sensitive adhesive (PSA) material, etc.), which may enable the frame 20 to be removed from (e.g., pulled away from, etc.) the cover without damaging the cover. Without limitation, the adhesive material 27 may comprise a moisture-resistant adhesive material, such as a silicone PSA material. The adhesive material 27 may comprise a medical grade adhesive material. The adhesive material 27 may adhere more strongly to a material of the frame 20 than to a material of the cover. Thus, upon removal of the frame 20 from the cover, the adhesive material 27 may tend to remain on the frame 20. In some embodiments, little or no residue of the adhesive material 27 may remain on the cover as the frame 20 is removed from the cover.

An upper surface 28 of the frame 20 may comprise a label. The label may receive information. Thus, the upper surface 28 may be printed upon (e.g., with a printer, etc.) and/or written upon (e.g., with pencil, ink, etc.). The upper surface 28 may be printed upon without negatively affecting the function of the frame 20 or the filter 10. Printing and/or writing on the upper surface 28 of the frame 20 may provide information about the filter, the cover, the cushion, and/or a patient using the cushion. For example, a date (e.g., a date on which the filter was placed on the cover; a date on which the filter is to be removed from the cover and replaced with another, clean filter; a date on which the cover or the cushion with which the cover is used is to be removed from service; etc.) may be provided on the upper surface 28 of the frame 20. As another example, information about the patient using the cushion (e.g., name, identification number, etc.) may be provided on the upper surface 28 of the frame 20. As yet another example, information about the location (e.g., room number, etc.) where the cushion has been used may be included on the label. In some embodiments, the information may be enabled as a code (e.g., a QR code, a bar code, etc.), which may enable the label to be scanned with a portable electronic device (e.g., a tablet computer, a smart phone, etc.) and cause the portable electronic device to display information about the cushion to which the filter 10 has been affixed.

The filter membrane 30 may comprise a breathable membrane that allows air to flow through it. Air may flow through the filter membrane 30 in a manner that maintains the integrity of other elements of the filter 10 and of an assembly (e.g., a cover, a cushion, etc.) of which the filter 10 is a part, including, but not limited to, seams of the filter 10 and the assembly of which the filter 10 is a part.

The filter membrane 30 may also resist the passage of water and, optionally, other liquids therethrough without impeding airflow through the filter membrane 30.

The filter membrane 30 may also serve as a barrier to particles, including dust (i.e., particles of sizes of about 1 micron (i.e., micrometer or μm) to about 400 microns across) and microorganisms (e.g., fungi, bacteria, mold spores, etc.). In some embodiments, the filter membrane 30 may limit or block particles having a size (e.g., a minimum distance across the particle, such as diameter of the particle, etc.) of 4 microns or greater, 2 microns or greater, 1 micron or greater, 0.5 micron or greater, or even 0.2 micron or greater from passing through it. The filter membrane 30 may have a pore size of 0.2 micron to 4 microns, including, but not limited to, a pore size of 0.5 micron to 4 microns, a pore size of 1 micron to 4 microns, and a pore size of 2 microns to 4 microns.

The filter membrane 30 may comprise a primary filter 34. The primary filter 34 may be formed from nonwoven porous material. For example, the primary filter 34 may comprise a thermoplastic material. Without limitation, the primary filter 34 may comprise a polytetrafluoroethylene (PTFE) film (e.g., an expanded PTFE (ePTFE) film, an oleophobic ePTFE film, etc.).

In some embodiments, the filter membrane 30 may reduce osmotic pressure against a feature (e.g., a vent, another filter, etc.) over which the filter membrane 30 is placed, which may provide protection against the passage of fluid through the filter membrane 30.

The primary filter 34 of the filter membrane 30 may be superimposed with and supported by a backing film 36 of the filter membrane 30. The backing film 36 may physically support, structurally support, or reinforce the primary filter 34. In some embodiments, the backing film 36 may be secured to the primary filter 34. For example, the backing film 36 may be laminated to the primary filter 34 (e.g., with an adhesive material, with heat and/or pressure, etc.). As another example, the backing film 36 may be fused with the primary filter 34 (e.g., by RF welding (e.g., at a frequency of 27.12 MHz±160 KHz, etc.), heat welding, compression welding, etc.).

The backing film 36 may comprise another non-woven porous material, such as a nonwoven polyvinyl chloride (PVC) film.

In a specific embodiment, the filter membrane 30 may comprise a nonwoven oleophobic ePTFE primary filter 34 and a nonwoven PVC backing film 36. Examples of such a filter membrane 30 are available from Spry Therapeutics of White Plains, New York as the PneumaPure® filter. U.S. Pat. Nos. 8,561,233 and 8,950,028 of Pneuma Pure I.P. Limited of Dublin, Ireland, the entire disclosures of which are hereby incorporated herein, describe such a filter membrane 30. Such a filter membrane 30 may have a pore size of as small as 2 microns or as large as 4 microns, which may provide a bacterial filtration efficiency of 100% while preventing water entry at a pressure of about 0.2 bar to about 0.8 bar and enabling airflow of about 20 L/min/cm$^2$ to about 40 L/min/cm$^2$ at a differential rate of about 1 bar.

In embodiments where the filter 10 includes one or more support layers 40, each support layer 40 may comprise a sheet or a film that physically supports or structurally supports the filter membrane 30. Each support layer 40 may be superimposed with the filter membrane 30. In some embodiments, a support layer 40 may be secured to the filter membrane 30. For example, the support layer 40 may be laminated to the filter membrane 30 (e.g., with an adhesive material, with heat and/or pressure, etc.). As another example, the support layer 40 may be fused with the filter membrane 30 (e.g., by RF welding (e.g., at a frequency of 27.12 MHz±160 KHz, etc.), heat welding, compression welding, etc.).

The support layer 40 may comprise a film formed from a breathable material that may mechanically strengthen the filter membrane 30. As an example, the support layer 40 may comprise bonded filaments or fibers of a suitable polymer, such as a thermoplastic polymer (e.g., polypropylene (PP), spunbond polypropylene, etc.).

Figure 2A:
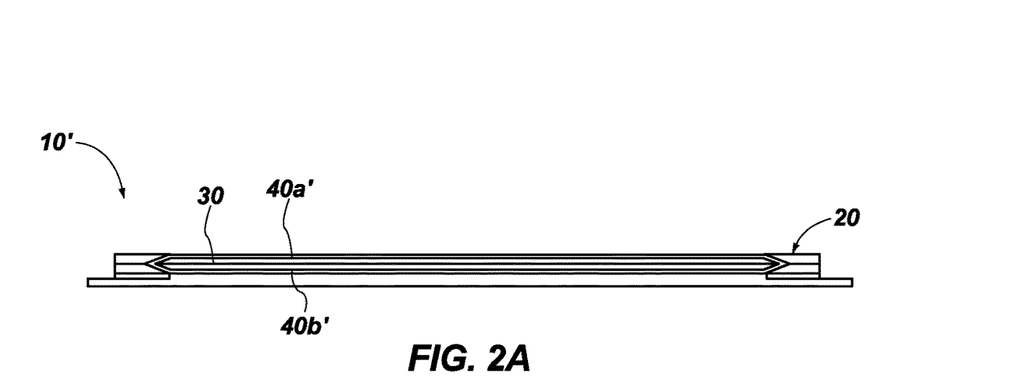
FIG. 2A is a cross-sectional representation (not to scale) of another embodiment of a filter according to this disclosure.

FIG. 2A depicts an embodiment of a filter 10' in which the filter membrane 30 is superimposed between, or sandwiched between, two support layers 40a' and 40b'. Each support layer 40a', 40b' may physically support the filter membrane 30. Each support layer 40a', 40b' may be secured to the frame 20 and/or the filter membrane 30 of the filter 10'.

An adhesive liner 50 may be releasably secured to the adhesive material 27 on the lower surface 26 of the frame 20 to protect the adhesive material 27 until the frame 20 is to be adhered to a cover of a cushion. The adhesive liner 50 may comprise a flexible film with a smooth surface that will adhere, or stick, to the adhesive material, but can be readily removed from the adhesive material while leaving substantially all of the adhesive material on the lower surface of the frame (i.e., without pulling the adhesive material with it). Without limitation, the adhesive liner 50 may comprise a polymeric (e.g., polyester, polypropylene, etc.) film, which may include a surface coated with a release layer (e.g., a silicone film, etc.). The adhesive liner 50 may extend across the entire frame 20, including over the window 24 through the frame 20. Thus, the adhesive liner 50 may protect the adhesive material 27 on the lower surface 26 of the frame 20 as well as a lower surface of the filter membrane 30 or support layer 40 exposed through the window 24 defined by the frame 20 until the adhesive liner 50 is peeled away from the lower surface 26 of the frame 20 to enable the filter 10 to be secured in place over an opening through a cover for a cushion.

Optionally, as shown in FIG. 2, a protective cover 60, or top liner, may be releasably secured to the filter 10 over a top surface of the filter membrane 30 or a support layer 40 (if any) that overlies the top surface of the filter membrane 30. The protective cover 60 may comprise a flexible film that may be adhesively secured (e.g., with a pressure-sensitive adhesive 67 adjacent to an outer periphery 65 of a lower surface 64 of the protective cover 60, etc.) to inner peripheral portions 25 of the upper surface 28 of the frame 20 to protect the top surface of the filter membrane 30 or a support layer 40 (if any) over the top surface of the filter membrane 30. Upon placement of the filter 10 over an opening through a cover for a cushion, the protective cover 60 may be peeled off the filter 10 to expose the filter membrane 30 or any support layer 40 over the filter membrane 30. As the protective cover 60 is removed from the inner peripheral portions 25 of the upper surface 28 of the frame 20, little or no residue of the pressure-sensitive adhesive 67 may remain on the upper surface 28 of the frame 20.

The filter 10 can be used with powered units (e.g., air powered cushions, etc.) and non-powered units to protect the inside of a cushion from ingress of pathogens and the area surrounding the cushion from the expulsion of harmful pathogens that might inadvertently enter the core during maintenance or the manufacturing process.

Figure 3:
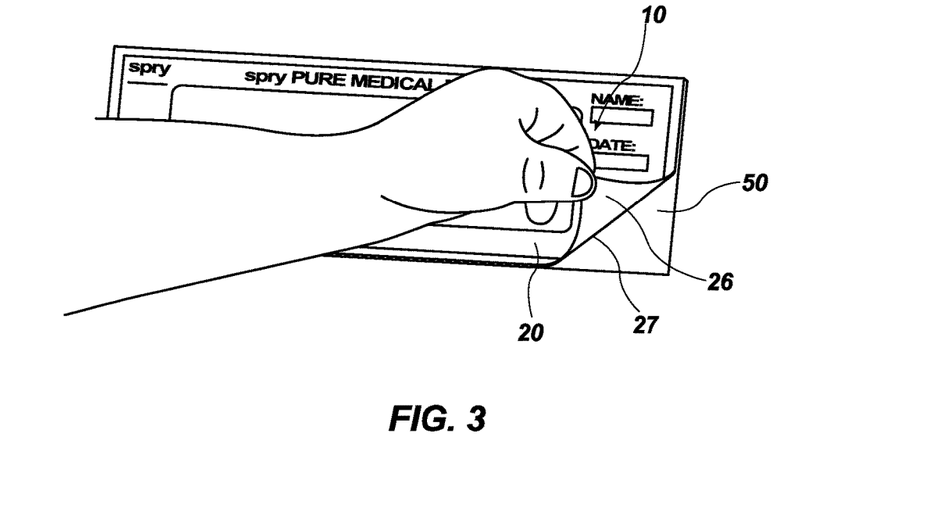
FIGS. 3 and 4 show removal of the embodiment of the filter shown in FIG. 1 from the adhesive liner.
Figure 4:
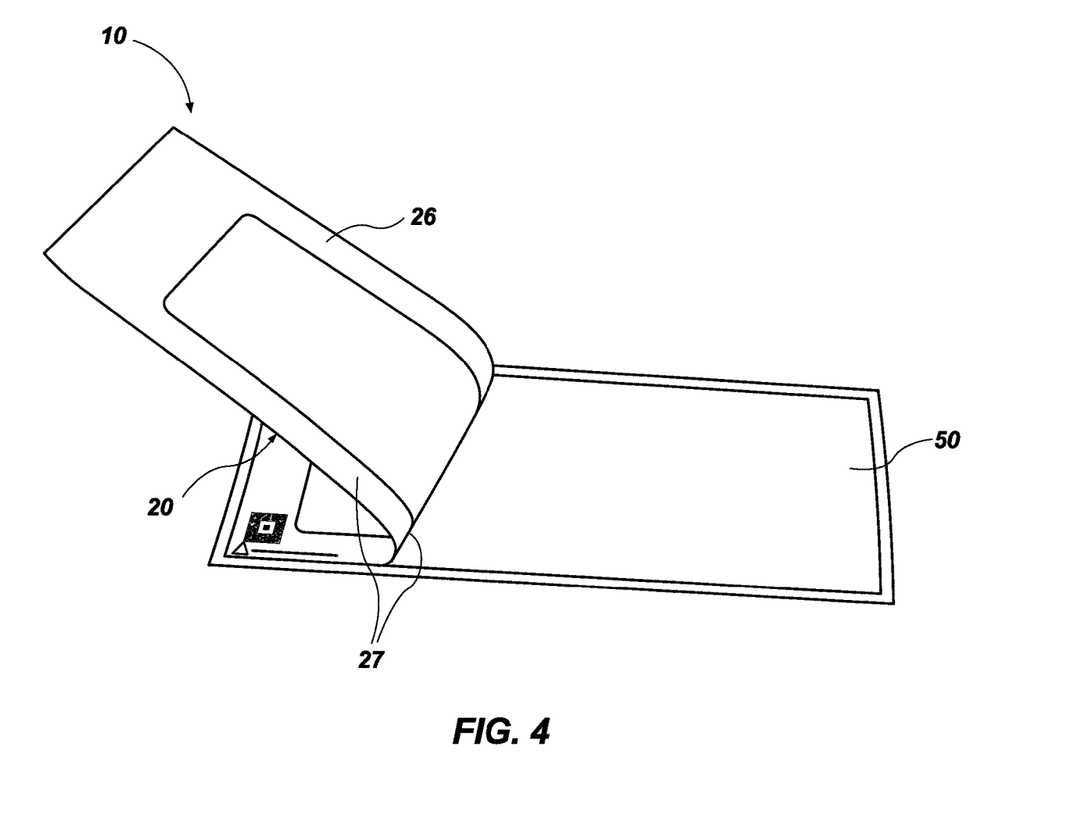

Turning now to FIGS. 3 and 4, removal of the filter 10 from its adhesive liner 50 is illustrated. More specifically, the adhesive liner 50 may be peeled away from the adhesive material 27 on the lower surface 26 of the frame 20 of the filter 10 or the filter 10 may be peeled away from the adhesive liner 50.

Figure 5:
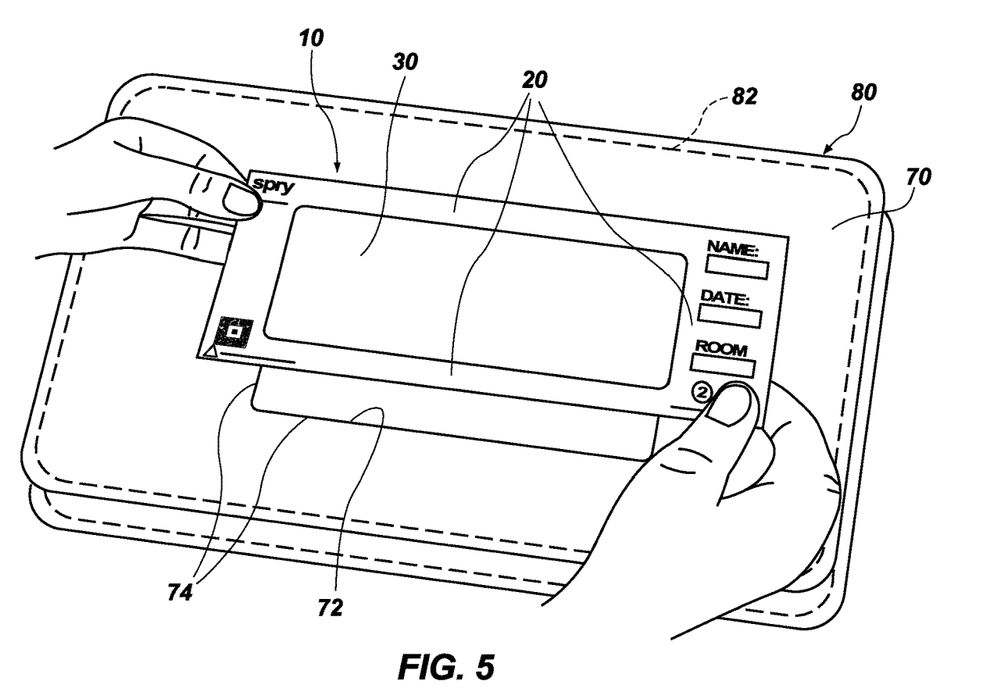
FIGS. 5 and 6 depict placement of the embodiment of the filter shown in FIG. 1 over an opening through a cover for a cushion.

With the adhesive material 27 on the lower surface 26 of the frame 20 of the filter 10 exposed, as shown in FIG. 5, the filter 10 may be positioned over, or superimposed with, an opening 72, or vent, through a cover 70 with a cushioning element 82 in its interior to define a cushion 80. More specifically, portions 74 of the cover 70 that surround the opening 72 may be prepared (e.g., cleaned, smoothed out, etc.) to receive the frame 20 of the filter 10. The filter membrane 30 of the filter 10 may be superimposed with the opening 72, while the frame 20 of the filter 10 may be positioned over, or superimposed with, the portions 74 of the cover 70 that surround the opening 72. Of course, the adhesive material 27 (FIGS. 3 and 4) on the frame 20 may face the portions 74 of the cover 70 over which the frame 20 is positioned.

Figure 6:
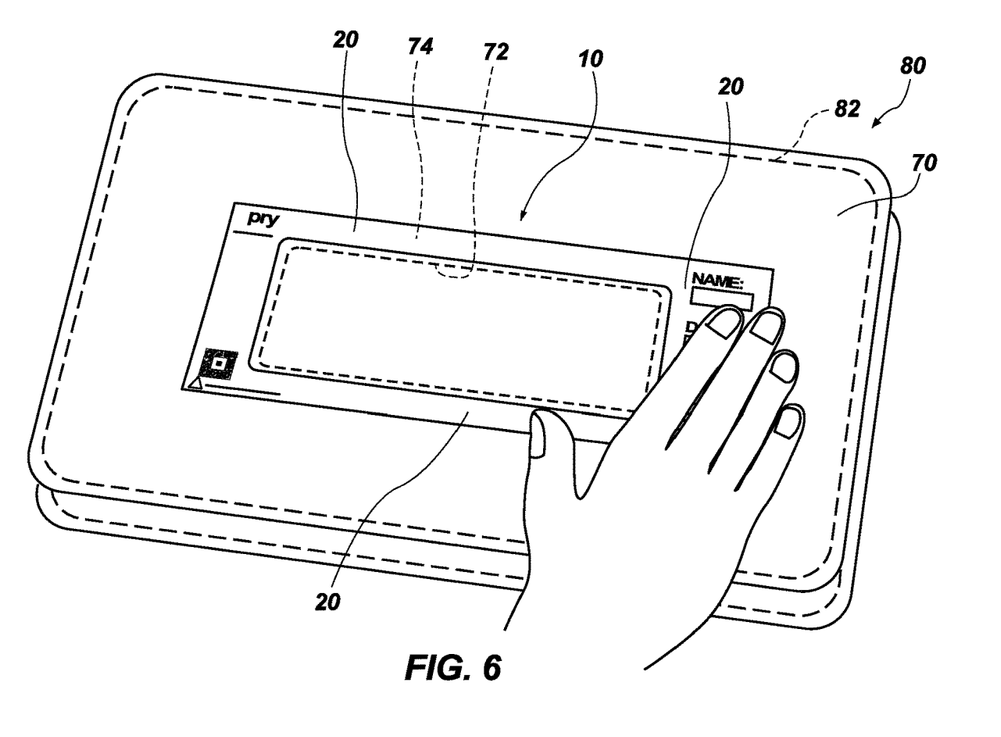

As illustrated by FIG. 6, once the filter 10 has been properly positioned with respect to the opening 72 through the cover 70 of the cushion 80, the filter 10 may be placed against the cover 70. While placing the filter 10 against the cover 70, the adhesive material 27 on the lower surface 26 of the frame 20 of the filter 10 may secure the frame 20 to the portions 74 of the cover 70 that surround the opening 72. Pressure may be applied around the frame 20 to seal the frame 20 against the portions 74 of the cover 70 that surround the opening 72 to seal the cushioning element 82 within the interior of the cover 70.

Figure 7:
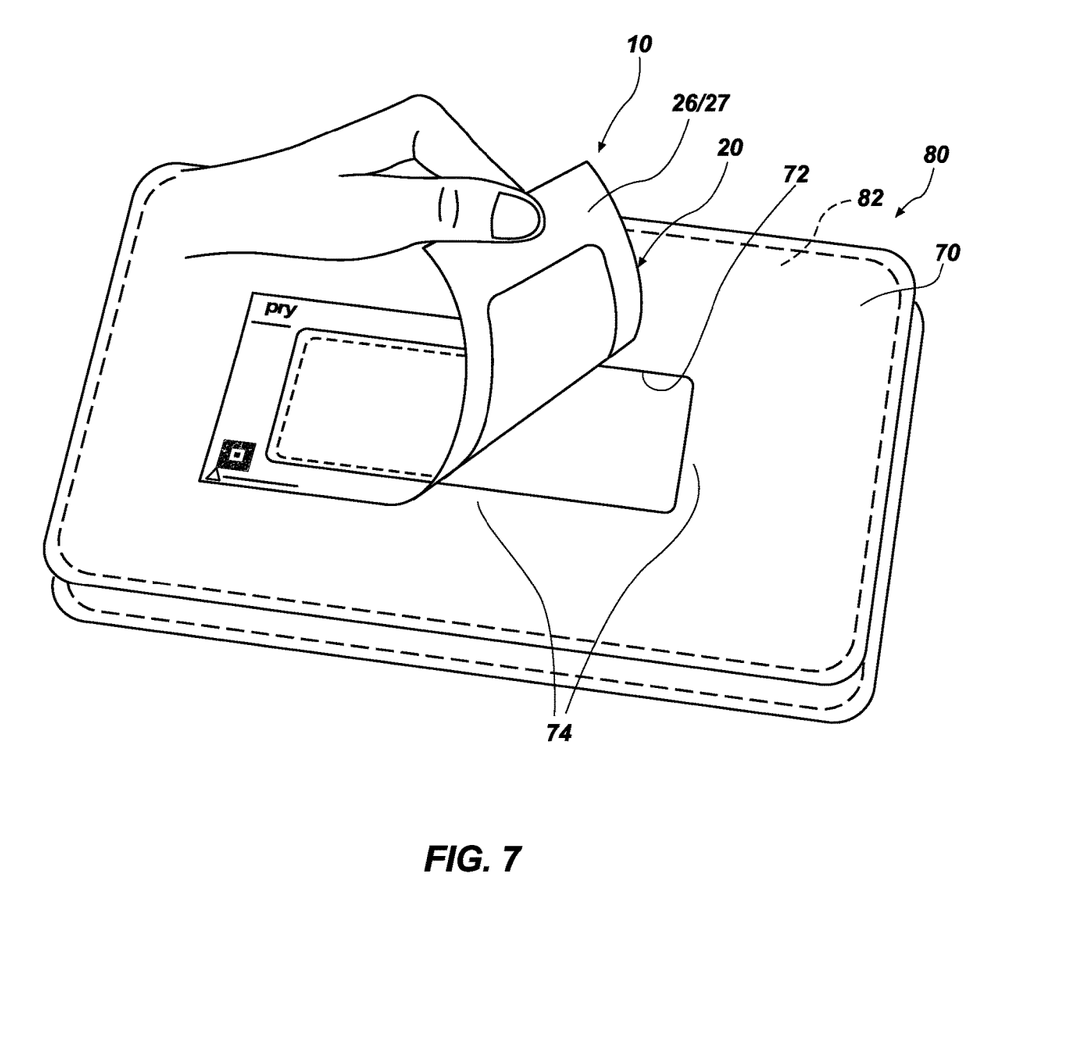
FIG. 7 depicts removal of the embodiment of the filter shown in FIG. 1 from over the opening the cover for the cushion shown in FIGS. 5 and 6.

FIG. 7 depicts removal of the embodiment of the filter 10 from over the opening 72 of the cover 70 for the cushion 80. The filter 10 may be removed periodically (e.g., at planned intervals, prior to use of the cushion 80 by an individual (e.g., between patients, or by a new patient after the cushion 80 was used by a prior patient, etc.), etc.). As shown, the filter 10 may be removed by grasping the frame 20 and pulling the frame 20 away from the portions 74 of the cover 70 that surround the opening 72. The force with which the frame 20 is pulled overcomes the strength with which the adhesive material 27 on the lower surface 26 of the frame 20 secures the frame 20 to the portions 74 of the cover 70 that surround the opening 72. As the filter 10 is removed, the opening 72 and, thus, the contents of the cover 70 (e.g., the cushioning element 82 within the cover 70, etc.) are exposed. They may be reprotected by replacing the filter 10, as shown in and described with reference to FIGS. 3-6.

With continued reference to FIGS. 3-7, the cover 70 may comprise a sealed cover 70. Such a cover 70 may be formed from an impermeable material. The impermeable material from which the cover 70 is formed and/or any seams in the cover 70 may meet certain guidelines. For example, the material of the cover 70 may comply with ANSI/AAMI PB70 liquid barrier performance specifications for protective gear used in healthcare facilities in the United States (e.g., seam strength, lint generation, tear resistance, evaporative resistance, breathability, etc.). Under such specifications, the cover 70 may be classified as a level three (moderate risk of transmission of infectious agents—typically trauma cases, emergency room) or as a level four (high risk—typically operating theater) item. An item that has been classified as level four may be formed from a material that is considered to be impervious, as determined by the blood barrier test (ASTM F1670) and the viral barrier test (ASTM F1671).

The impermeable material of the cover 70 may comprise a film or a fabric, such as a thermoplastic polyurethane (TPU), a polyurethane laminate (PUL) fabric, or polyester.

In some embodiments, the material that forms the cover 70 may have antimicrobial properties (e.g., it may be treated with an antimicrobial chemical (e.g., polyhexamethylene biguanide (PHMB), etc.), an antimicrobial material may be incorporated into it, etc.).

In embodiments where the cover 70 includes seams, the seams may be impermeable. As a few nonlimiting examples, any seams of the cover 70 may be formed by radiofrequency (RF) welding, heat sealing, compression sealing, or the like.

The cover 70 may include an interior within which an item (e.g., a cushion (e.g., a pillow, a mattress, a mattress topper, a positioner, a seat cushion, etc.), bedding, etc.) may be disposed. In embodiments where the cover 70 is placed over a cushion 80 or is part of a cushion 80, a resiliently deformable filling material (e.g., foam, poly fiber, etc.) may be located within the interior of the cover 70. The filter 10 may increase a useful life of the item within the interior of the cover 70 (e.g., by preventing contaminants from entering into the cover 70, etc.).

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A sealed cover for a cushion, comprising:
an impermeable material defining an exterior of a cover and an interior of the cover and meeting requirements for at least a level three classification under ANSI/AAMI PB70 liquid barrier performance specifications;
an opening extending through the impermeable material to enable communication between the exterior and the interior; and
a filter removably positioned over the opening to seal the cover and including:
a frame with a window therethrough, the frame including a lower surface carrying a releasable adhesive material securing the frame to the impermeable material and an upper surface comprising a label; and
a filter membrane extending across the window, the filter membrane and the releasable adhesive material providing an antimicrobial barrier over the opening.

2. The sealed cover of claim 1, wherein the filter membrane and the releasable adhesive material further provide a water-resistant barrier to the opening.

3. The sealed cover of claim 1, wherein the label bears customized information about the cushion.

4. The sealed cover of claim 1, wherein the label prevents dust from entering into the interior of the cover.

5. The sealed cover of claim 1, wherein the cover meets requirements for a level four classification under the ANSI/AAMI PB70 liquid barrier performance specifications.

6. The sealed cover of claim 1, further comprising:
at least one impermeable seam.

7. A cushion, comprising:
a sealed cover with an exterior and an interior and including:
an impermeable material defining the exterior and the interior and meeting requirements for at least a level three classification under ANSI/AAMI PB70 liquid barrier performance specifications;
an opening extending through the impermeable material to enable communication between the exterior and the interior; and
a filter removably positioned over the opening and including:
a frame with a window therethrough, the frame including a lower surface carrying a releasable adhesive material securing the frame to the impermeable material of the sealed cover and an upper surface comprising a label; and
a filter membrane extending across the window, the filter membrane and the releasable adhesive material providing an antimicrobial barrier over the opening of the sealed cover; and
a cushioning element within the interior of the sealed cover.

8. The cushion of claim 7, wherein the cushioning element comprises a pillow, a mattress topper, a mattress, or a seat cushion.

9. The cushion of claim 7, wherein the filter membrane and the releasable adhesive material further prevent dust particles from entering into the interior of the sealed cushion.

10. The cushion of claim 7, wherein the cover meets requirements for a level four classification under the ANSI/AAMI PB70 liquid barrier performance specifications.

* * * * *